(No Model.)
S. ELLIOTT & H. P. RICHARDS.
WHEEL TIRE.
No. 442,730.  Patented Dec. 16, 1890.
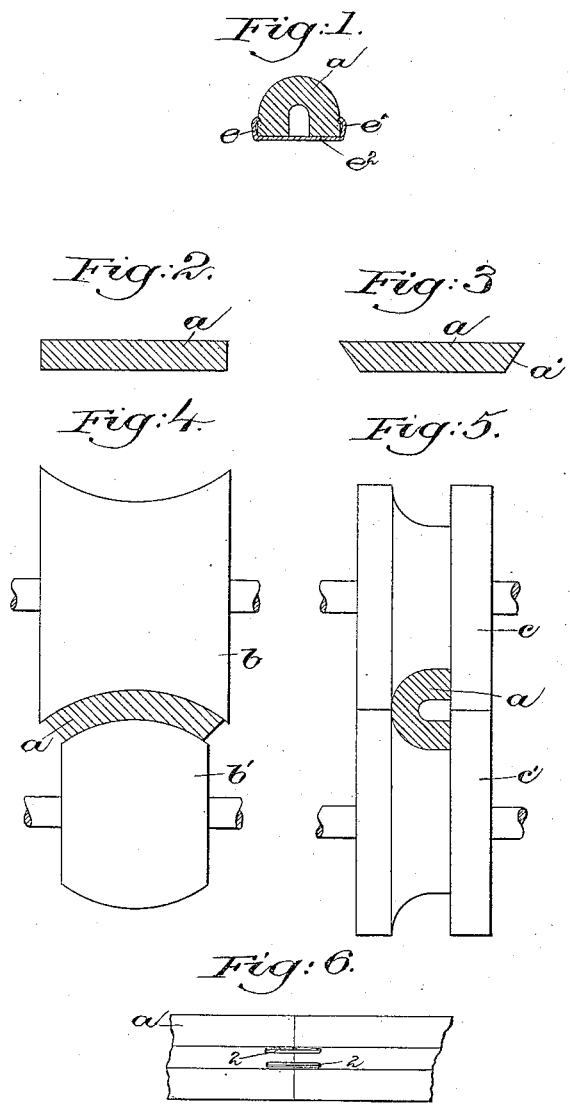

UNITED STATES PATENT OFFICE.

STERLING ELLIOTT AND HUBERT P. RICHARDS, OF NEWTON, MASSACHUSETTS.

WHEEL-TIRE.

SPECIFICATION forming part of Letters Patent No. 442,730, dated December 16, 1890.

Application filed March 9, 1888. Serial No. 266,709. (No model.)

*To all whom it may concern:*

Be it known that we, STERLING ELLIOTT and HUBERT P. RICHARDS, of Newton, in the county of Middlesex and State of Massachusetts, have invented an Improvement in Wheel-Tires and Method of Applying the Same, of which the following description, in connection with the accompanying drawings, is a specification, like letters and figures in the drawings representing like parts.

This invention has for its object to construct a very durable wheel-tire and to make and apply the same to a wheel by a novel method.

In accordance with this invention the tire is formed by bending a strip of leather or equivalent material over upon itself longitudinally from end to end or in the direction of its length, leaving a convex tread-surface and exposing to wear but one face of the strip, the said bent strip being secured to the felly of the wheel, both edges of the strip bearing against the felly. Preferably the convexed face or side exposed to wear and constituting the tread-face will be the hair side if leather be used.

The attaching device for the tire consists of a metal band having side flanges, between which the bent tire is placed or sprung.

As a preferable way of making and applying the tire, we take a strip of leather or other material, reduce it to an even thickness throughout its length, bevel the two side edges, and then bend the strip longitudinally upon itself in the direction of its length by suitable rollers, and then by rollers or pliers spring the strip so bent between the two side flanges of the metal band, the two side edges of the strip bearing directly against the outer face of the band between the flanges. The tire bent in this manner presents a very hard tough tread-face, as the fibers or particles of the strip at such point are compressed. The metal band, between the flanges of which the tire is sprung, will be preferably attached to the felly of the wheel by nails or equivalent fastenings, although it is obvious that said band may be made strong enough to serve as the felly itself.

Figure 1 shows in transverse section a flanged metal band having a tire embodying this invention placed in position; Fig. 2, a transverse section of the stock from which the tire is formed; Fig. 3, a similar view of the strip having the side edges beveled; Fig. 4, a vertical section of a pair of rollers having between them the strip shown in Fig. 3; Fig. 5, a vertical section of a pair of rollers having between them the strip shown in Fig. 4; and Fig. 6 the strip shown in Fig. 5 properly bent to be sprung between the side flanges of the metal band, as shown in Fig. 1, and having suitable fastenings for the ends.

The tire is herein shown as made from the strip $a$ (see Fig. 2) of leather or equivalent material, which is reduced or skived to an even thickness. The two side edges of the strip $a$ are then beveled, as shown at $a'$, Fig. 3. The strip is then passed between a pair of rollers $b\ b'$, (see Fig. 4,) one of which, as $b$, has a concave periphery, and the other of which, as $b'$, has a convex periphery, to thereby bend the strip $a$ transversely. The strip $a$ thus bent is then passed between a pair of rollers $c\ c'$, each of which has a grooved periphery of substantially the same shape in cross-section, as shown in Fig. 5, to thereby bend the strip longitudinally upon itself. The bent strip after being acted upon by the rollers $c\ c'$ is then sprung by pliers or other suitable implements between the side flanges $e\ e'$ of a metal band $e^2$, (see Fig. 1,) the outer ends of the flanges being somewhat inturned to bite into and hold the bent strip.

When the tire, bent as described, is placed in position between the flanges of a metal band, the two side edges of the tire previously beveled rest flush against the face of the band, thereby presenting a smooth outer or tread face composed of one side only of the material used—such, for instance, as the hair side if leather be used. The strip $a$ being bent upon itself, as shown, the tread-face is very hard and durable, the fibers being somewhat compressed, and the strip, it bearing against the face of the metal band, as described, cannot collapse.

The ends of the tire are fastened by means of staples 2 or other suitable fastening passing from the inside outward, as shown in Fig.

6. These fastenings are inserted at any time desired, either before or after the strip is bent.

The metal band $e$ may be attached to the felly of the wheel by nails, screws, or other suitable and equivalent fastenings, or it may be made sufficiently strong and durable to serve as the felly itself.

While we have herein shown a preferable way or method by which the strip may be bent and placed in position, yet it is obvious that it may be bent by other means than that herein shown.

We claim—

1. The combination, with a wheel and a metal band $e^2$, having side edges $e\ e'$, of a tire composed of a strip of leather or equivalent material bent longitudinally or in the direction of its length to present a convexed tread-face, said bent strip, with its edges abutting against the band, being held in place between the side edges $e\ e'$ of said band, substantially as described.

2. The method herein described of making leather or equivalent wheel-tires, which consists in beveling the side edges of a strip of leather or equivalent material and then subjecting it to pressure to bend it longitudinally upon itself and form a convex tread-surface, substantially as described.

In testimony whereof we have signed our names to this specification in the presence of two subscribing witnesses.

STERLING ELLIOTT.
   HUBERT P. RICHARDS.

Witnesses:
 FURNISS MURDOCK,
 J. W. BACON.